April 9, 1935.  P. E. PERMAN  1,997,341
ICE MAKING
Filed March 24, 1931   4 Sheets-Sheet 1
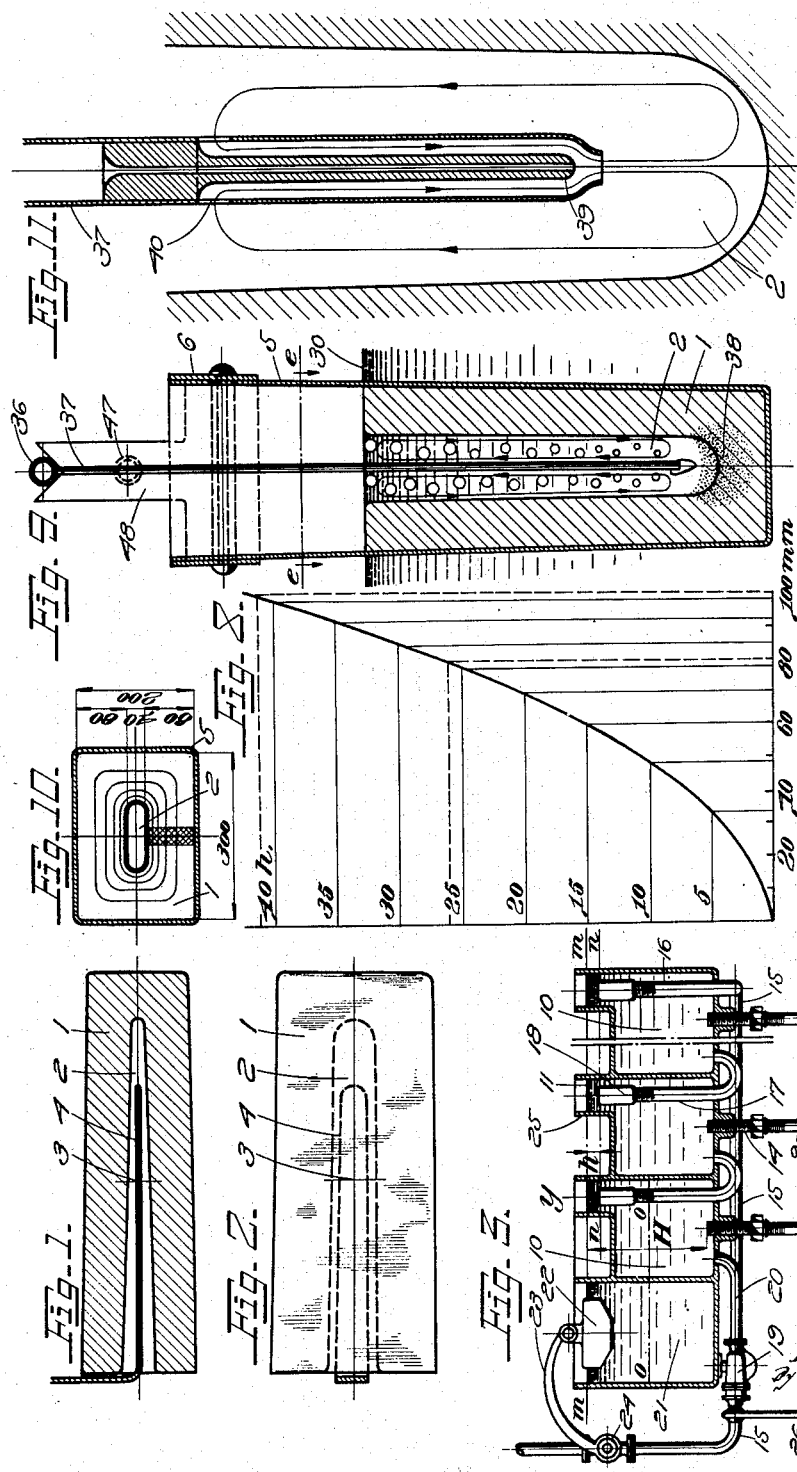

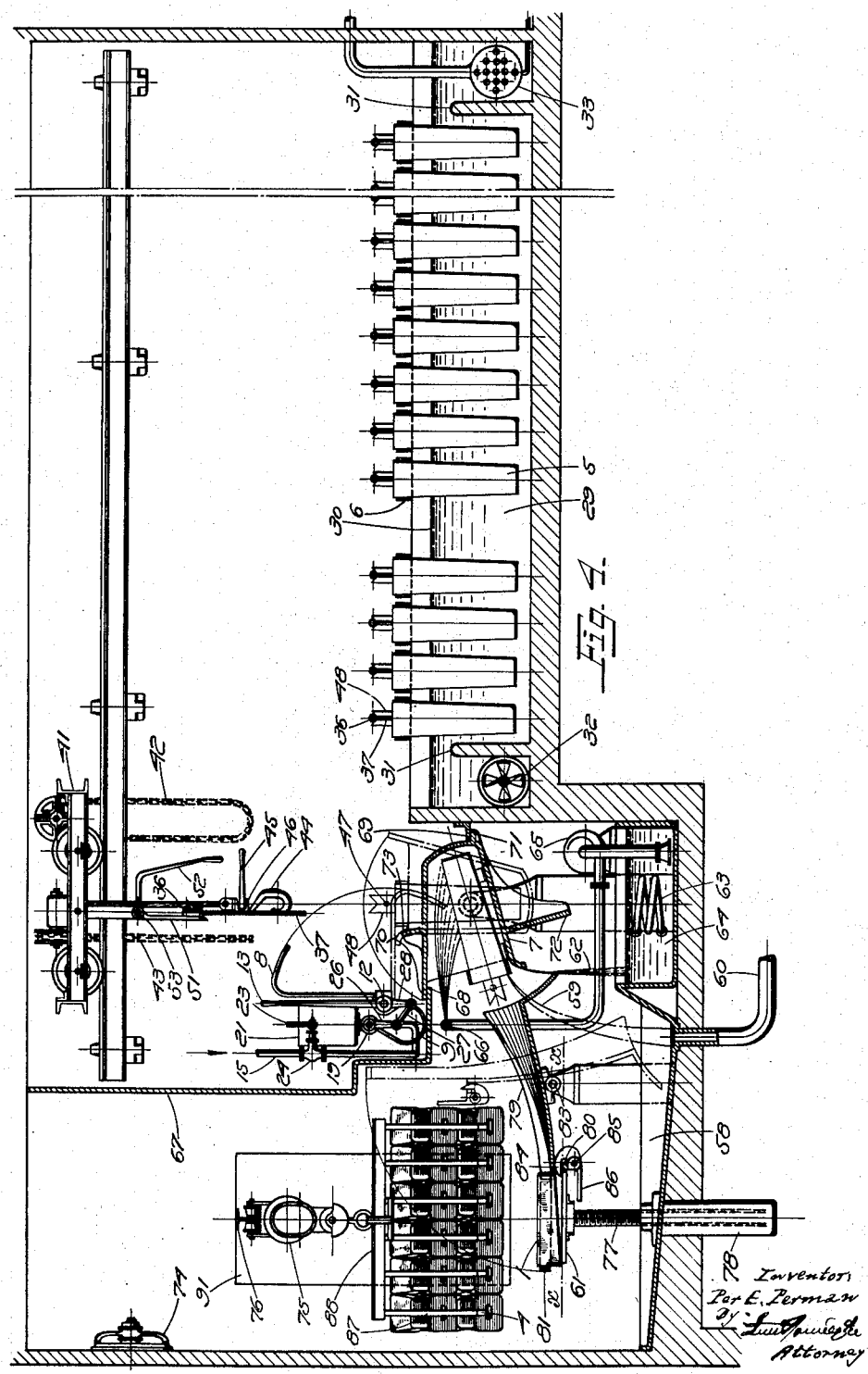

April 9, 1935.    P. E. PERMAN    1,997,341
ICE MAKING
Filed March 24, 1931    4 Sheets-Sheet 3
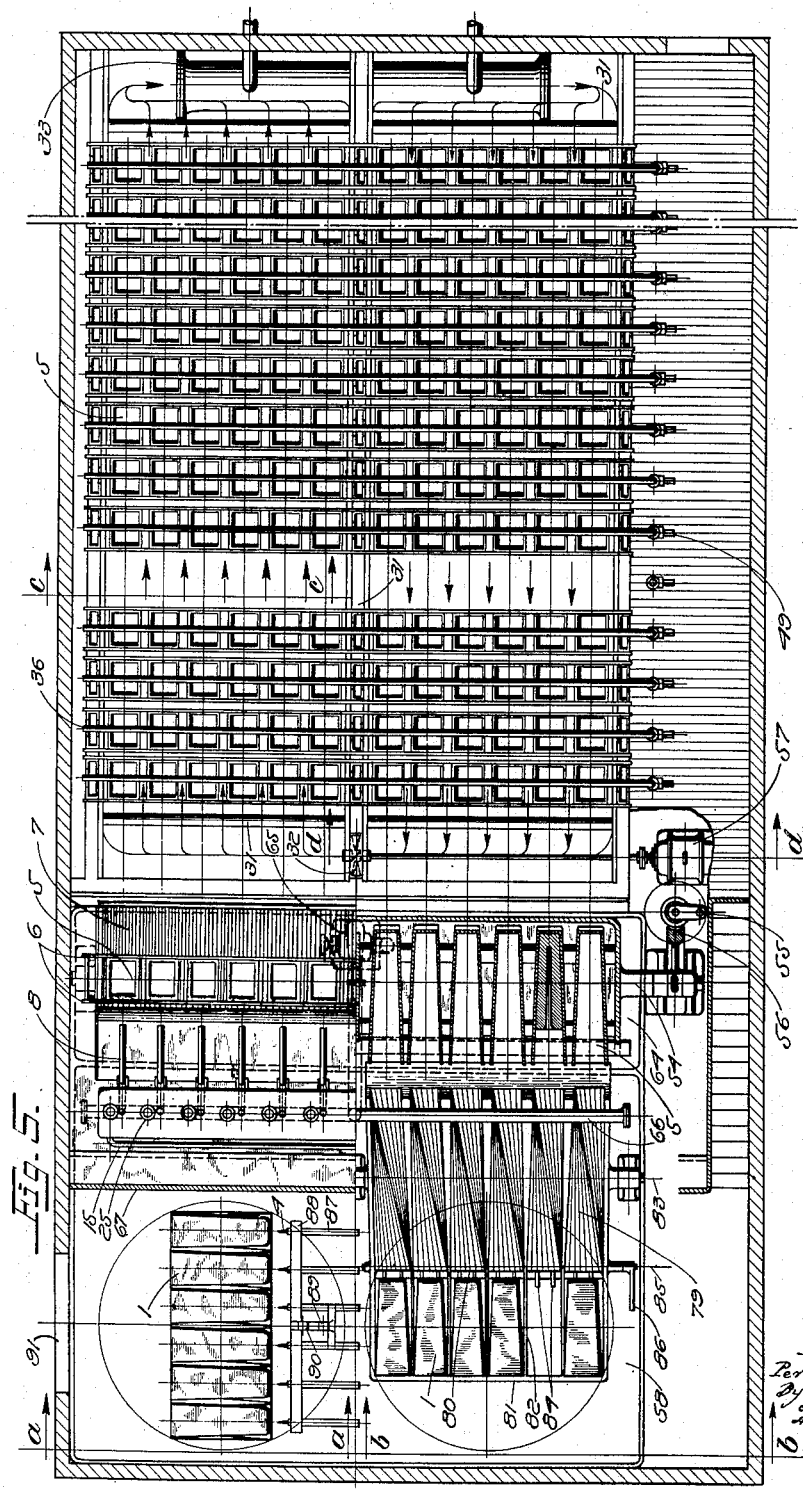

April 9, 1935. P. E. PERMAN 1,997,341
ICE MAKING
Filed March 24, 1931 4 Sheets-Sheet 4
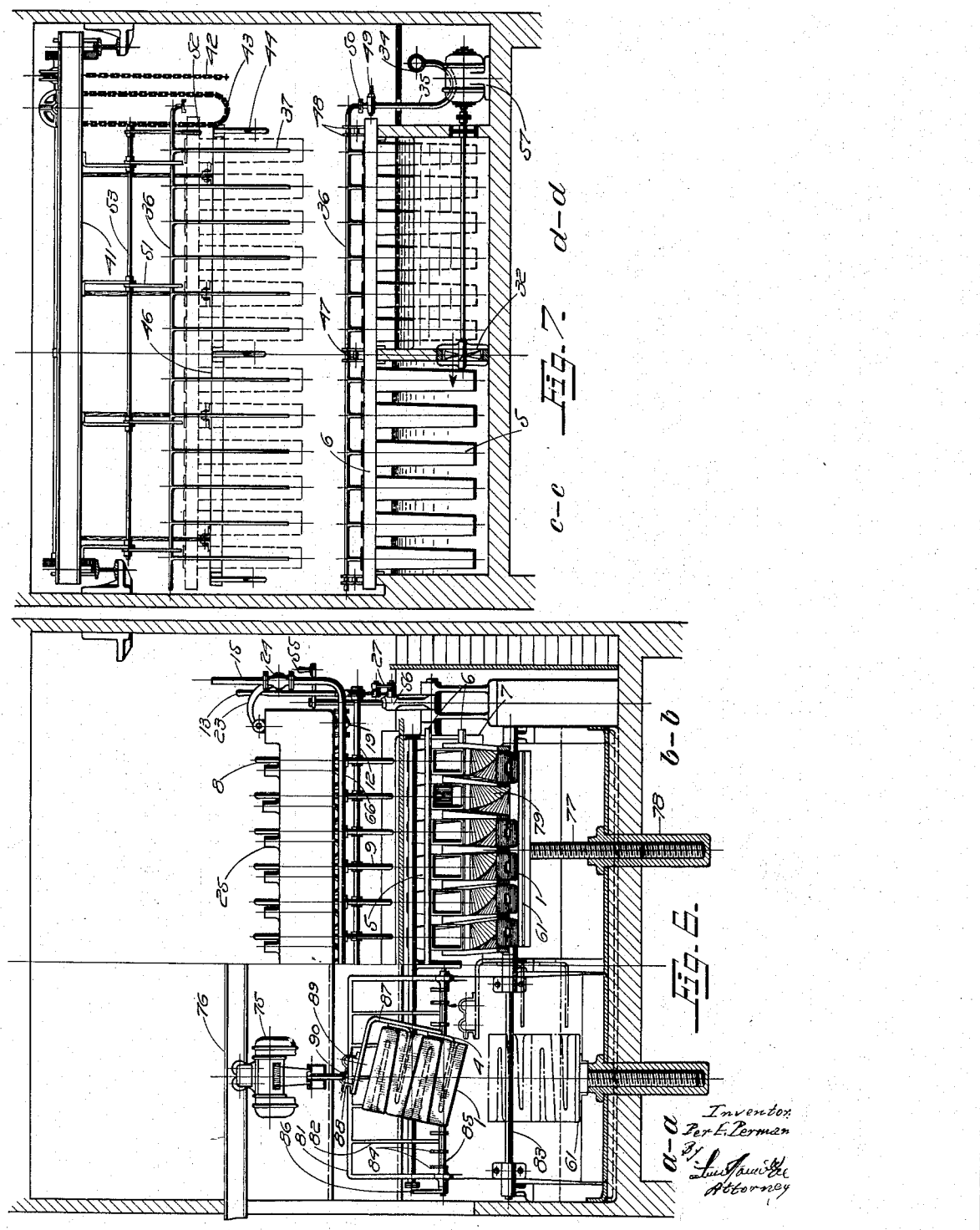

Patented Apr. 9, 1935

1,997,341

UNITED STATES PATENT OFFICE 1,997,341

ICE-MAKING

Per Emil Perman, Stockholm, Sweden

Application March 24, 1931, Serial No. 524,903
In Sweden November 31, 1929

3 Claims. (Cl. 62—172)

The present invention has for its object the manufacture of ice, particularly so called can-ice, and the invention involves a method of and means for various proceedings in manufacturing.

From an economical point of view one of the most important proceedings in said manufacturing consists in conveying the formed ice-blocks from the apparatus out of the ice-making factory. Said ice-blocks can be conveyed direct to carts or to a store. The ice-blocks conveyed to the store will be subsequently removed therefrom to the carts. By systems hitherto known the ice-blocks are conveyed successively, that is to say, block by block. This working system has the disadvantage of requiring a good deal of manual work, even when mechanical means are used. It is also time-wasting in that machines and apparatus which are employed cannot be entirely utilized. Further it is to be observed, that the product by this method of conveyance is rather mutilated by knocks and also by damage caused by tongs and other tools.

Changing to parallel or multiple conveyance is preeminently desirable but here a great difficulty will be met in the conveyors catching the load. In multiple conveyance a load unit will be composed of a number of blocks, properly accumulated. The catching ought to be done easily and the load should be easily released and, naturally, means as simple as possible should be used. On this point my invention asserts itself by shaping the particular ice-blocks in such a manner that they are practical from different points of view especially as to means of conveyance.

The shaping as mentioned consists in providing the ice-blocks with a canal, extending from one end of the block to its center of gravity and a bit beyond it.

In addition to the product mentioned above the present invention also consists in a method of manufacturing this product, further also in means for carrying this method into effect. The invention involves various novel features cooperating in a high degree to moderate the price of the manufactured product.

A plant for ice-making consists as known of two chief parts differing thoroughly one from the other, namely of a refrigerating machinery and a machinery for freezing by means of the refrigeration produced by the refrigerating machinery. The present invention relates almost exclusively to the freezing process. How refrigeration is brought about is of no importance and is therefore left aside.

In the manufacturing of can-ice sheet metal cans, having usually the form of a cut pyramid with a rectangular base, are charged with a quantity of water of the same weight as that of the ice-block to be made and are immersed in a cooling liquid of low temperature. In the said liquid, the freezing point of which naturally must be somewhat lower than the temperature at which ice-making takes place, the cans have to remain until all water in them has congealed. The cans which are usually grouped in frames are then raised, frame by frame, by the aid of a travelling crane and removed to a thawing apparatus where the ice-blocks are released from the cans by means of tepid water, whereupon the said cans are recharged with water and again sunk in the cooling liquid, the released blocks being taken away from the thawing apparatus and transported out of the ice-making factory.

Below a specified description will be presented and the various novel features included in the present invention will be apparent as the description proceeds. The specification is presented with reference to the accompanying drawings of which:

Fig. 1 is a longitudinal section of an ice-block with a lifting staff put into it according to this invention.

Fig. 2 is a plan view of the same ice-block and the same lifting staff.

Fig. 3 is a vertical longitudinal section through the charging apparatus of the cans.

Fig. 4 is a vertical longitudinal section through the ice-making factory.

Fig. 5 is a plan view of the ice-making factory.

Fig. 6 is a half cross-section taken on line a—a and a half cross-section taken on line b—b of Fig. 5.

Fig. 7 is a half cross-section taken on line c—c and a half cross-section taken on line d—d of Fig. 5.

Fig. 8 is a graphical representation of the connection between the time of freezing and the thickness of the ice within the cans.

Fig. 9 is a vertical longitudinal section through a can with an ice-block and the air-pipe into it.

Fig. 10 is a horizontal cross-section taken on line e—e of Fig. 9.

Fig. 11 is a vertical section through the lower part of a canal of an ice-block and through the air-pipe into it.

The manufactured product, as described above, is shown in Figs. 1 and 2. The ice-block 1 has an ordinary pyramidal outer shape, but it is provided with a canal 2, extending from one of the cross-sides toward the opposite side a little beyond the center of gravity of the block. The canal must extend from one end of the block at least to the center of gravity, but may, if desired, extend entirely through the block. The motive for a minimum is that the ice-block always shall be in stable equilibrium in the length-direction on a staff 4, belonging to a conveying organ, put into the canal 2 at such a length that its point will take a position beyond the block's centre of gravity 3.

The manufacturing begins by charging a number of cans 5 (see Figs. 4 and 5) grouped in a frame 6 which is placed into a turning trough 7 (further comments on this will be given below). A series of charging pipes 8 connected by means of flexible tubes 9 with a series of measuring cells 10 containing a determined quantity of water 11 are positioned above the cans. Said charging pipes 8 are fastened to a common turning shaft 12 provided with a heaver 13. By turning the shaft 12 the charging pipes 8 all at once are brought into their respective cans 5, and the measuring cells 10 are discharged into said cans 5. This must be done so that every can 5 will receive an equal quantity of water.

At this point it should be noted that my invention includes a new method and new means of bringing about an equal distribution of water to the different cans 5. Such a distribution is a matter of great importance in the manufacturing of canal-ice. As previously pointed out the cans 5 are each charged from its own measuring cell 10 as shown in Fig. 3. The flexible tubes 9 mentioned above communicate with the measuring cells 10 by regulating faucets 14, the depth of which beneath the surface of water $m$—$m$ is the same in all the filled cells 10; the depth determining the quantity of water discharged from each cell 10. The faucets 14 are vertically adjustable by means of threads, and thus the required quantity of water can be fixed as desired. The cells 10 are supplied from a water-pipe 15. In Fig. 3 an apparatus is shown for filling consecutively the cells 10. The water-pipe 15 is connected to an inlet pipe 16 leading into the right wing-cell 10, from which a connecting pipe 17 leads to the neighbouring cell 10, and from this last-mentioned cell 10 another connecting pipe 17 leads to the third cell 10 etc. The inlet pipe 16 and the connecting pipes 17 should preferably have their mouths on the same level $n$—$n$ and in any event as near as possible to the surface of water $m$—$m$. In order to make possible a convenient adjustment of the depth $h$ of the mouths beneath the surface of water $m$—$m$, the pipes 16 and 17 also are provided with faucets 18. These faucets are adjustably connected to the pipes by means of threads, so that the level of the outlet of the faucets may be varied. A pipe 20 provided with a valve 19 connects the left wing-cell 10 with a cell 21 having a float-gauge 22, which by means of a lever 23 can open or close a valve 24 in the water-pipe 15.

The characteristic feature of this new method and of the apparatus for obtaining an equal distribution of water consists in reducing as much as possible the surface of water Y above the faucet 18 of every cell 10. This is carried into effect by providing the cells 10 at the top with narrowing necks 25, in which the faucets 18 of the supplying pipes 16 and 17 of the cells 10 are positioned. The valve 19 of the cell 21 is turned simultaneously as the pipes 8 by means of the heaver 13, the valve 19 being provided with a lever 26, connected by a rod 27 (shown in Figs. 4 and 6) with a lever 28, fastened to the turning shaft 12 of the pipes 8.

The apparatus works in the following manner. When the charging of the cans 5 is going on the pipes 8 are brought into the cans 5. In this position of the shaft 12 the valve 19 of the pipe 20 is closed. All the cells 10 consequently become discharged, but in the cell 21 of the float-gauge 22 the surface of water retains its highest position $m$—$m$, and at the corresponding position of the float-gauge 22 the valve 24 of the pipe 15 is also closed. The cans 5 being charged, the pipes 8 are raised by means of the heaver 13 and at the same time the valve 19 is automatically opened. The water in the cell 21 is then divided to the left wing-cell 10 through the pipe 20, until the surface of water in both these cells reaches the level $o$—$o$. The float-gauge 22 will then drop and thus open the valve 24 of the pipe 15, whereupon the cells 10 are filled consecutively from the right wing-cell to the left. At the same time as the left-wing cell is filled the cell 21 of the float-gauge 22 is also filled, by which the valve 24 of the pipe 15 is closed, so that the water in all the cells 10 takes a stable equilibrium on the level $m$—$m$. Then the cells 10 are filled again and a working cycle is accomplished.

It is quite clear that an unequal distribution of water can occur only at the moment when the surface of water in the cell 21 and in the cells 10 is dropping from the level $m$—$m$ to the level $n$—$n$. Below the last-mentioned level the water in the cells 10 is quite separated. It is further clear that the greatest fault of distribution, which can theoretically arise, consists of a volume of water $h$, Y, and that this fault can arise only under such circumstances that the outlets of two neighbouring cells 10 are stopped. According to what is mentioned above, the quantities $h$ and Y are, however, respectively very small, and the volume of water $h$, Y is thus infinitesimal in proportion to the volume of a cell 10. The fault of distribution, that can arise in reality, for instance because of unequal resistance in the flexible tubes 9 and in their inlets 14 and outlets 8, will naturally be only a little fraction of the volume $h$, Y. The fault of the distribution can therefore be regarded as practically nil.

The inventive idea underlying the distribution of water described above, being from practical point of view exact, can also be applied even if the cells 10 are filled simultaneously, with the limitation, however, that one cell 10 must always be filled after the other and at the same time as the cell 21 of the float-gauge 22 is filled.

In the manufacturing of ice-blocks provided with canals, so called canal-ice, it is not only the distribution of water which is of importance but also the quantity of water. The most practical manner of making canal-ice consists in stopping the freezing process after the canal 2 has been reduced to a certain size previously determined, then taking away the water not congealed and finally releasing the blocks 1. Under such circumstances the most practical manner of giving the blocks a weight previously fixed consists in charging the cans 5 with a quantity of water of a weight which is as much higher than the weight of the blocks to be made as the weight of the water that the canals 2 in the frozen blocks will contain. This method, apparently very simple, cannot be carried out, however, without certain arrangements mentioned below.

After the cans 5 of the frame 6 in the turning trough 7 have been charged in the manner described above, the frame 6, in the manner described below, is removed to a certain place in a basin 29, containing cooling liquid 30, most frequently consisting of common salt dissolved in water. The basin 29 is provided with partition walls 31, so that an endless circulating path (indicated in Fig. 5 with arrows) is obtained for the cooling liquid 30, the motion of which being caused for instance, by one or more screws 32. The frame 6 is placed on the upper edges of the walls of the basin 29. The cans 5 fastened to the frame 6 will then hang down in the cooling liquid 30 to such a depth that the surface of the water in the cans 5 will be on about the same level as the surface of the cooling liquid 30 around them.

On a suitable place in the endless path of the cooling liquid 30 a refrigerator 33 is placed which cools the cooling liquid 30, so that its temperature is permanently kept down below the freezing point of the water. In consequence of the low temperature the water in the cans 5 successively congeals. Under this process heat is transferred through the can-walls to the cooling liquid 30, and from the cooling liquid 30 to the refrigerator 33.

Since the freezing in the cans 5 is naturally taking place from the walls towards the center (see Fig. 10), the center-part of the ice-block 1 takes the longest time to congeal. By discontinuing the freezing process after a certain period a canal 2 of a certain size is obtained in the center-part of the block 1. In consequence with what is mentioned above about charging of the cans 5, the block 1 will also receive the weight previously fixed. It can easily be gathered that the temperature of the cooling liquid 30 is somewhat higher in front of the refrigerator 33 than behind it. The consequence of this is again, that the freezing will take place more rapidly in the cans 5 in the colder part of the cooling liquid than in those which are in the part of the cooling liquid that is less cold.

This would by itself be of no importance, if the frames 6 were not, as often is the case, extended over compartments of cooling liquid having different temperatures. By common freezing of solid ice-blocks this circumstance does not cause any other trouble but a certain prolongation of the freezing time. By freezing of canalblocks, on the other hand, the canals 2 of the blocks 1 will receive different sizes, which must be prevented for several reasons. By the present invention this is done by periodically reversing the circulation of the cooling liquid, for instance, every hour. An apparatus suitable for this purpose may consist of an electric motor 57 turning the screw 32. The electrical circuit of said motor is provided with switches by which the currents can be reversed, either automatically or by hand.

It has already been mentioned, that the canals 2 have for their object to work in conjunction with the conveying means. (Further comments on this will be given below.) Now it will, however, be observed, that the same canals 2 have another advantage of great importance, namely, a most considerable reduction of the freezing time, calculated per weight unit of ice. In Fig. 8 the connection between the time of freezing and the thickness of the ice is graphically shown. It is calculated according to common thermic laws and with the temperature of the cooling liquid of $-7°$ C. The corresponding curves, showing the growth of a section of the block 1 for every fifth hour are drawn up in Fig. 10. The calculations are referred to a parallelepipedon, perpendicular to one wall of the can 5 and with a base of any size. The parallelepipedon is marked on Fig. 10 by cross-lines.

From Fig. 8 it is seen that a layer of ice of a thickness of about 34 mm. is formed during the first 5 hours of the freezing time, while a layer of ice of only about 6 mm. is formed during the time between the 35th and the 40th hour. It is clear that the great reduction of the freezing periods depends on the increasing thickness of the ice, by which the transmission of heat from the water in the center is in corresponding degrees rendered more difficult. If the greatest cross-section of the ice-block 1 and the canal 2 have actual dimensions as shown in Fig. 10, it is clear that the freezing time of a solid block must be calculated according to a thickness of ice of 100 mm. and the freezing time of the canal blocks according to a thickness of ice of 80 mm. As per Fig. 8 the freezing time of a solid block thus is about 42 hours and the freezing time of a canal block about 27 hours. In this manner a very considerable reduction of the freezing time is reached. As an ice-making factory always works with considerable permanent thermic losses, it is evident that these losses calculated per weight unit of ice will be reduced in the same proportion as the freezing time, which results in a considerable increase of the output of the factory. The space needed for the manufacturing will also be reduced to the same proportion as the freezing time. Both these circumstances are factors of great economic importance in ice-making.

When making can-ice, it is always necessary to keep the water in the cans 5 in motion during the freezing time. One of the reasons for this is to prevent the air, which is present in the water, from being in the ready-frozen ice-blocks, which would cause the ice to be milk-white. The motion is commonly caused by air being pumped through the water, a method which requires very simple mechanical means. From a common feeding-pipe 34 (see Fig. 7) compressed air is conveyed through flexible tubes 35 to a distributing pipe 36, from which air-pipes 37 are led into every can 5. When the air is pressed through the air-pipes 37 into the water in the cans 5, air bubbles of fair size are formed, which rise out of the water and put it in motion by their potential energy and by their expansion. By the freezing, the air contained in the water is set free in the form of small air bubbles, which are absorbed by the large air bubbles, mentioned above, and carried off with them.

Pumping air through the water has, however, a disadvantage. In most cases the water contains small quantities of iron, most frequently consisting of soluble carbonate of iron, which by influence of the air is oxidized to rust, which is insoluble. Rust is thus precipitated, and it has of course a tendency to sink to the bottom of the canal 2. This is a drawback because of the insignificant motion of the water in the bottom of the canal 2. The motion of the water besides lessens in the same degree as the size of the canal 2 is reduced. If the air (as shown in Fig. 9) without special measures is allowed to enter the water in the usual manner, the motion of the water will be almost exclusively dependent on the potential energy of the air bubbles. Hereby the water in the bottom of the canal 2 is not worked upon. The result is also, that precipitations 38 of different kinds are formed in the bottom of the canal 2, which is very detrimental to the appearance and the purity of the ice.

The present invention embodies special means for transforming the actual energy of the air to motion of the water in the bottom of the canal 2. A member having a nozzle 39 is fitted into the pipe 37 at a point spaced from its end and openings 40 are provided in the tube 37 so that water can enter and flow in tube 37 around said nozzle 39. The air flowing out of nozzle 39 exerts a suction on the water in tube 37 causing it to flow out of the end of tube 37 with the air. Owing to its force of inertia the water continues its motion a certain distance outside the end of the air-pipe 37, thus causing a strong circulating motion of the water in the lowest part of the canal 2. The course of this local circulating motion is shown in Fig. 11. Without special measures and means the course of the motion of the water is such as shown in Fig. 9.

A further feature in the freezing process will in this connection be touched upon. If the water is kept in motion during the freezing process the ice will be free of dissolved and puddled substances as well as bacteria. The result of this is, that the water in the center-part of the ice-block 1 as the freezing process proceeds gets rich in substances, mentioned above. This last-mentioned phenomenon cannot continue beyond a certain degree, depending on the activity of the motion of the water, without causing muddiness in the ice. By the means, mentioned above, of getting a strong motion of the water at the bottom of the canal 2, it has been possible, however to continue the freezing process until the unfrozen center-part of the block 1 has become very small.

By limiting the cross-section of the canal 2, several points of view must be taken into consideration. Firstly sufficient space must exist for the staff 4, but from this point of view the section can be rather small. As regards the appearance the section can also be small. As regards the freezing time, however, a larger cross-section of the canal 2 is desirable. The actual size of this section is thus the result of a compromise. Here the quality of the ice can be left aside, for by the new method of air-pumping it is always possible to avoid muddying of the ice. When the cross-section of the canal 2 has grown to the size, previously fixed, the air-pumping is discontinued and the unfrozen water is immediately emptied, before any of it has time to freeze. Hereby the ice-block 1 is automatically made free from foreign matter, and quite pure ice, clear as glass, is obtained.

The emptying of water and ice from the cans 5 is done by means of the turning trough 7, normally in unbroken succession. The frames 6 are thus moved to this trough 7 as the freezing proceeds. It is mentioned above, that the canals 2 and the ice-blocks 1, by the reversing of the circulation of the cooling liquid, obtain a fixed size after a certain freezing time. The cans 5 in the different frames 6 shall of course have an equal freezing time. In order to derive continuous manufacturing, the freezing process is so arranged, that the frames 6 are successively ready-frozen in equal intervals. The emptying of their cans 5 must thus take place successively, frame by frame, until all the frames 6 in the basin 29 are handled, after which the frame 6, which was relieved first should be ready for the next emptying and so on.

The moving of the frames 6 is done by means of a travelling crane 41. By help of a chain 42 the travelling crane 41 is moved to the frame 6, which is the nearest to be emptied. By help of a lifting chain 43 a beam 46, provided with dogs 44 and a heaver 45, is lowered so that the dogs 44 are able to catch hold of taps 47, which are applied to consols 48 fastened to the frames 6. The consols 48 also serve as supports for the distributing pipes 36. A valve 49, applied to the flexible tube 35, is closed, and the tube-connection 50 behind it is opened, after which the corresponding frame 6, with its cans 5 and the released air-pipes 36 and 37, is lifted so high, that it can be transported above the frames 6, which remain in the basin 29 of the cooling liquid 30. In this position of the lifted frames 6, the dogs 51, applied to a shaft 53 provided with a heaver 52, can catch hold of the distributing pipe 36 of said frame 6. By means of the travelling chain 42 the crane 41 is moved to the turning trough 7, in which the frame 6 by means of the lifting chain 43 is placed, while the distributing pipe 36 with its air-pipes 37 is kept in the raised position by the dogs 51. The air-pipes 37 in this manner leave the cams 5. After the frame 6 has been put down the beam 46 is set free and lifted as is required to get it out of the way. After emptying, the frame 6 is moved back by executing the same movements but in another series (instead of working by hand electrical means are commonly used for moving as well as lifting). In the method specified above the practically wholly automatic handling of the air-pipes 37 is new.

The emptying of the water in the center-part of the ice-block 1 is done by turning the trough 7 round its axis 54, so that the cans 5 obtain a sloping position with their inlets downwards. The turning is done by means of a crank 55 with appendent transmission, for instance a screwgearing 56. Because the water in the center-part of the ice-block 1 has a temperature of 0° C. it is made use of in the refrigerating machinery where water of a low temperature is required for several purposes. This water is poured into a basin 58, which is so placed, that it catches the water-cascades 59 leaving the cans 5. From said basin 58 the water is led into the refrigerating part of the factory through a pipe 60. In the same basin 58 is also spilt ice from the receiving apparatus and water from melting ice collected. This necessitates the basin 58 to be extended below the receiving apparatus.

The releasing of the ice-blocks from the cans 5 is done while the trough 7 is turned down. In this position the cans 5 are washed with tepid water, by which the ice-blocks 1 as they loosen, automatically and independent of one another slide down on a receiving table 61. The cooled washing water, which as a cascade 62 leaves the trough 7, is collected in a basin 64 provided with a radiator 63. In this basin 64 the washing water is again heated and by means of a pump 65 pumped back in the washing pipe 66, thus the process becomes a cyclic one. When all the ice-blocks 1 have left the cans 5 in the trough 7, the pump 65 is stopped whereupon the trough 7 is turned back.

By the washing with tepid water some water is always evaporated. In order to prevent the water vapor diffusing and condensing in the factory, a certain part of it is screened by a wall 67, provided with an opening, in which the turning trough 7 is placed, so that it closes tightly the edges 68 and 69 of the opening, in the turned position with lists 70 and 71 and in the upright position with lists 72 and 73. From the same small part of the factory, cut off by the wall 67, the vapor is easily carried away by means of fans 74.

In the beginning of this specification it is mentioned that the conveying of the ready-frozen ice-blocks 1 from the apparatus can be done by multiple conveyance, that is that the blocks 1 would be conveyed in load units, consisting of a number of blocks, properly accumulated. Such a load unit is shown in Fig. 4, hanging on a travelling block 75, moving on a beam 76. By means of this block 75 the load unit is transferred. As shown in Fig. 4 the load-unit consists in this case of 24 blocks, accumulated into 6 vertical piles, side by side, with 4 blocks lying zig-zag in every pile. Of course the load-unit may be made up in many different ways as to the form and the number of the blocks. It is, however, useful to make the number of the vertical piles suit the number of the cans 5 in the frames 6. The last mentioned number ought suitably to be an even multiple of the number of vertical piles. If, for certain reasons, for instance the capacity of the carriages, a number of six vertical piles is suitable, the frames 6 ought to contain 6, 12, 18 et cetera cans 5 most preferably forming groups of 6 cans in each. In this manner the apparatus for accumulating the ice-blocks to load-units will be very simple.

The accumulating is done by means, which will now be described. It is mentioned above, that the ice-blocks 1, as they loosen, slide down on receiving tables 61. The width of these tables 61 is almost equal to the length of the ice-blocks 1, and their length is suited so that each table 61 is fastened to pillars 77 provided with threads. The pillars 77 are screwed into cylinders fastened to the floor and also provided with threads on the inside. By means of this apparatus it is possible to turn the table 61 and at the same time lower or raise it. Between the trough 7 and the receiving table 61 sloping conduits 79 are placed, in which the blocks 1 slide when they move from the cans 5 to said tables 61. The conduits 79 are turned screw-like in their length-direction up to an angle of 90°, as shown in Figs. 4–6, so that the blocks 1, leaving the cans 5 lying on the edges, arrive at the receiving tables 61 lying on their broad sides. If the blocks 1 have a rectangular cross-section, it is useful to have them lying on their broad sides in the load units. This method is adhered to, when the blocks are placed in the basin 29, which ought to be done in such a manner, that they have their broad sides parallel with the set of the current of the cooling liquid. If this is the case, it is most preferable to relieve the blocks 1 from the cans 5 in the event that the cans 5 are lying on their edges, as shown in Figs. 4–6.

Variations can occur, however. If the ice-blocks 1 lie on the same side in the load-units and in the trough 7, the conduits 79 must not be turned. Said conduits 79 are fastened together, so that they form groups, one in front of every table 61. Each group of conduits is provided with a guiding apparatus, consisting of a recoiling list 80, placed somewhat above the receiving plane X—X of the blocks 1, a stop-list 81 circumferencing the three open sides of the table 61, and partition lists 82, which really are the extended vertical walls of the conduits 79. Each group of the conduits, and also its guiding apparatus, can be turned in a vertical direction round an axis 83. The aggregate ought to be balanced. The sides of the ice-blocks 1, leaving the cans 5, are wet, owing to the thawing. In consequence of the low temperature of the blocks 1 the wet film congeals in a very short time. During this time the ice-blocks 1 must be kept free from the plane of the receiving table 61 in order to avoid getting stuck to it through the new created ice. For this purpose movable supports 84 are placed under one of the ends of the blocks 1, so that only their opposite ends will rest on the receiving table 61. The wet film having congealed, the supports 84 are taken away. They are therefore adequately fastened to a turning shaft 85, which in its own turn is fastened to the recoiling list 80 and provided with a lever 86.

The accumulating apparatus works in the following manner. From the conduits 79 the blocks 1 slide to the receiving table 61, which is regulated in regard to its vertical position, so that its plane is placed under the recoiling list 80 which forms a stop for the recoiling movement of the blocks. Striking the stop-list 81, the blocks 1 recoil but are stopped by said stop, formed by the recoiling list 80 at the boundary-line between the conduits 79 and the table 61. Then their tops will be resting on the supports 84. The blocks 1 thus will have their downward sides raised from the plane of the table 61. During the passing on the table 61 the blocks 1 are guided by the partition lists 82. When the first layers of blocks in the vertical piles of the load-unit have occupied the position described above, on the receiving table 61 and rested in said position until the sides of the ice-blocks 1 are frozen, the supports 84 are taken away by turning the shaft 85 a certain angle by means of the lever 86. The blocks 1 then fall down on the plane of the table 61, and the guiding apparatus is lifted away by its turning round the axis 83 and angle of such magnitude, that the ice-blocks become released. Then the receiving table 61 is screwed down a distance equal to the thickness of a block 1, that is to such a position that the upper sides of the ice-blocks, lying on the table, coincide with the plane, which the table 61 occupied before. In this connection it may be pointed out, that the blocks 1, lying on the table 61, in this new position of the table 61 must turn their tops against the stop-list 81, which the blocks 1, sliding from the frames 6, always are facing. This is easily attained by fixing the pitch of the threads on the pillar 77 to an odd multiple of the double thickness of the block 1. Then the bases of the new layer of blocks will face the opposite direction to the tops of the layer, lying on the table 61 below. Thus the taper of the ice-blocks 1 is compensated. After the table 61 has been screwed down, the guiding apparatus is returned to its working position. The supports 84, which are balanced adequately by the heaver 86, regain automatically their working position, that is such a position that they project beyond the bases of the blocks 1, lying below. When the next frame 6 is relieved, the process described above is repeated. The load-unit thus has increased in vertical direction with one layer. The wanting layers of the load-unit are put into their position in the same manner. The load-unit, being of full size, the guiding apparatus is turned to vertical position. Then it will be space enough for the removing of the load-unit by means of suitable conveying apparatus, whereupon the receiving table 61 is raised to its starting position.

It is mentioned above, that the ice-blocks 1 can be moved by means of a staff 4, which is put into the canal 2. On this fact the system for transporting the load-units is based. The transport is done by means of conveying organs (see Figs. 4-6), consisting of the staffs 4, which are fastened to hooks 87, which again are fastened, side by side and one for every vertical pile of the load-unit, to a beam 88. The distance between the staffs 4 on the vertical arms of the hooks 87 is equal to the thickness of two ice-blocks 1, placed zig-zag one over the other. Every staff 4 also carries two ice-blocks placed zig-zag one on the top of the other, and is for obvious reasons put into the canal 2 of the ice-block, which lies below. The distance between the hooks 87 on the beam 88 is equal to the width of a pile plus the thickness of a partition list 82.

The conveying organ, thus composed, is provided with two fastening loops, one 89 used when the conveying organ does not carry the load, and adapted for giving the conveying organ a horizontal equilibrium, and the other 90 used when the conveying organ is loaded and adapted for giving, in this later case, the conveying organ an inclined equilibrium, so that the ice-blocks 1 of the load-unit tend to slide as much as possible against the hooks 87, whereby the ice-blocks always remain on the staffs 4. The conveying organ is applied to a travelling block 75, moving on a beam 76, which is placed above the receiving tables 61 and in the vertical symmetry-plane Y—Y of the load units (see Figs. 4 and 5), when the load-units on the tables 61 are turned to the position, in which they will be lifted.

The removing of the load-unit by means of the conveying organ described above, is done in the following manner. When uncharged, the conveying organ has, as mentioned above, a horizontal equilibrium, and it can thus be brought into such a position by the side of the load-unit that every staff 4 comes right before a canal 2 (see the dotted lines in Fig. 6). Agreeable to this, the conveying organ can also by moving the travelling block 75 be directly shoved into the load-unit sideways. Then the fastening means are charged, and the loop 90 is made use of. When lifted, the load-unit then gets the position, described above (see Fig. 6). In this elevated position the load-unit is horizontally revolvable. Due to this arrangement it can be removed through a relatively small doorway 91. When released, the load-unit retains its shape, and when the load-unit has been put down and the conveying organ is taken away, this organ can be applied to the load-unit again.

Thus the load-unit can, from time to time, be moved from one place to another. This fact is of very great importance, because it opens many possibilities of accommodation by arranging the conveying system in the most practical manner.

Of very great importance is also the fact that the conveying organ can be put into the load-unit sideways, by which it is made possible to fill a store completely and also easily empty it. It may be pointed out, however, that, by putting load-units on the top of each other, it is advantageous to apply horizontal lists between them. If not, the plane surfaces of the ice-blocks on account of the force of suction stick so tightly together, that the power necessary for lifting the load-units will have to be unnecessarily great. The same draw-back is encountered, if the load-units get frozen together. To avoid this eventuality the lists, mentioned above, are also useful.

Having now described my invention, what I claim as new and desire to secure by Letters Patent is:

1. In an ice-making plant having thawing apparatus and ice-receiving tables, receiving apparatus for ready-frozen can-ice, consisting of conduits between the thawing apparatus for loosening the blocks and the receiving tables, said conduits being turned screw-like in their length direction an angle of 90° and fastened together, so that they form groups turnable around an axis.

2. In the method of making ice in cans, the steps comprising partially thawing the outer surface of a block of ice to loosen it in its can, removing the ice from the can, and placing the block of ice on a receiving table with substantially its entire surface exposed for a period of time sufficient to freeze the wet film on the surface of the ice.

3. In the method of making can-ice in blocks provided with central canals, the steps of tilting a can containing the frozen ice to a position at which liquid water will flow out of the canals, then passing tepid water in contact with the outside of the cans while they are in the tilted position to loosen and discharge the ice-blocks from the cans, collecting the water passed over the outside of the cans and separately collecting the water discharged from the canals in the ice-blocks.

PER EMIL PERMAN.